United States Patent
Zafiroglu et al.

(10) Patent No.: US 7,264,861 B2
(45) Date of Patent: Sep. 4, 2007

(54) ABRASION-RESISTANT COMPOSITES WITH IN-SITU ACTIVATED MATRIX RESIN

(75) Inventors: Dimitri Peter Zafiroglu, Centreville, DE (US); Stephen H. Tsiarkezos, Elkton, MD (US)

(73) Assignee: Xymid, LLC, Petersburg, VA (US)

( * ) Notice: Subject to any disclaimer, the term of this patent is extended or adjusted under 35 U.S.C. 154(b) by 110 days.

(21) Appl. No.: 10/403,208

(22) Filed: Mar. 31, 2003

(65) Prior Publication Data

US 2004/0191470 A1 Sep. 30, 2004

(51) Int. Cl.
*D04H 11/00* (2006.01)
*B32B 5/02* (2006.01)
*B32B 5/06* (2006.01)
*B32B 5/22* (2006.01)

(52) U.S. Cl. .......................... 428/85; 428/95; 442/148; 442/383; 442/388; 442/402

(58) Field of Classification Search .................. 428/85, 428/95; 162/146; 442/148, 383, 388, 402
See application file for complete search history.

(56) References Cited

U.S. PATENT DOCUMENTS

| | | | |
|---|---|---|---|
| 4,298,643 A | 11/1981 | Miyagawa et al. | |
| 4,421,809 A | 12/1983 | Bish et al. | |
| 4,497,871 A | 2/1985 | Henke | |
| 4,773,238 A | 9/1988 | Zafiroglu | |
| 4,876,128 A | 10/1989 | Zafiroglu | |
| 4,888,228 A * | 12/1989 | Sidles | 428/86 |
| 5,075,142 A | 12/1991 | Zafiroglu | |
| 5,221,707 A * | 6/1993 | Chihara et al. | 524/267 |
| 5,573,850 A * | 11/1996 | Cunningham et al. | 428/373 |
| 5,654,065 A * | 8/1997 | Kishi | 428/86 |

(Continued)

OTHER PUBLICATIONS

Kirk-Othmer Encyclopedia of Chemical Technology, vol. 15, "Leather-like Materials," pp. 177-192, (1995).

(Continued)

*Primary Examiner*—Artl R. Singh
*Assistant Examiner*—Matthew D. Matzek
(74) *Attorney, Agent, or Firm*—The H.T. Than Law Group (57) ABSTRACT

A composite sheet is disclosed. The composite sheet comprises an open random fibrous web having substantially vertical fibers near a top surface, a first binder resin and a second binder resin, wherein the first binder resin has a melting point lower than the melting point of the second binder resin, wherein the melting point of the second resin is lower than the melting point of the web, wherein the resins are activated in situ with the web fibers to form a resin-fiber rich region on the top surface and wherein the abrasion-resistant sheet can withstand at least about 3,000 cycles on the Wyzenbeek abrasion test using 80-grit abrasive paper. An abrasion-resistant sheet comprising a single binder resin and other abrasion-resistant sheets are also disclosed. Processes for making these abrasion-resistant sheets are further disclosed herein.

25 Claims, 2 Drawing Sheets

U.S. PATENT DOCUMENTS

| | | | |
|---|---|---|---|
| 5,880,043 A * | 3/1999 | Lorenz et al. | 442/94 |
| 5,902,663 A * | 5/1999 | Justesen et al. | 428/95 |
| 6,051,300 A | 4/2000 | Fink | |
| 6,063,473 A * | 5/2000 | Zafiroglu | 428/86 |
| 6,290,866 B1 | 9/2001 | Lesko et al. | |
| 6,503,595 B1 * | 1/2003 | Kim et al. | 428/97 |
| 6,645,610 B1 | 11/2003 | Reis et al. | |
| 2001/0033925 A1 * | 10/2001 | Trapp et al. | 428/311.51 |
| 2004/0161588 A1 * | 8/2004 | Mauk et al. | 428/143 |

OTHER PUBLICATIONS

PCT International Search Report of PCT/US/09657.

PCT Written Opinion of PCT/US/09657.

International Search Report from the International Bureau issued Jun. 23, 2005.

Written Opinion of the International Searching Authority mailed Feb. 11, 2005.

* cited by examiner

ABRASION-RESISTANT COMPOSITES WITH IN-SITU ACTIVATED MATRIX RESIN

FIELD OF THE INVENTION

This invention generally relates to an abrasion-resistant composite sheet and to process for making same. More particularly, this invention relates to a composite sheet reinforced by resin activated in-situ.

BACKGROUND OF THE INVENTION

It is known to combine various woven, knit or nonwoven fabrics with plastic sheets or resin layers or to impregnate them with resins to form composite sheets intended for use in thermoforming and molding processes. For example, U.S. Pat. No. 5,075,142, to Zafiroglu and Japanese patent application publications 63-111050 and 63-162238 disclose such composite sheets. U.S. Pat. No. 4,298,643, to Miyagawa et al, discloses a particular fabric having an exposed pile layer, the back of the fabric being bonded or laminated to a thermoplastic sheet. Although moldable composites have been utilized widely in many applications, such composites are in need of improvement when intended for use in articles that are subject to severe abrasion, such as athletic shoe parts, luggage corners and surface layers, protective work clothes, heavy-duty sacks and the like.

Pile fabrics, such as velvets, velours, terry cloths, moquettes, tufted fabrics, and the like, each have a surface layer in which fibers are generally vertical to the surface of the fabric. Certain stitch-bonded fabrics, in which a fibrous layer is contracted and buckled by means of elastic threads attached to the fibrous layer to form a layer of pile-like groups of fibers, are disclosed by U.S. Pat. Nos. 4,773,238 and 4,876,128 to Zafiroglu. Generally, such pile or pile-like fabrics are not incorporated in composite sheets. Japanese laid-open patent applications 64-85614 and 64-85615 disclose a floor mat, which includes a tufted-monofilament pile, having an 8 mm height and a 0.08 g/cm³ pile fiber concentration, onto which a rubber resin is sprayed. The combination of the pile fiber and resin comprises 38% by weight of resin and has an average density of 0.13 g/cm³. Increases in the abrasion resistance of such floor mats could significantly improve their utility.

U.S. Pat. No. 6,063,473 entitled "Abrasion-Resistant Composite Sheet" to Zafiroglu discloses relatively thin pile or pile-like fabrics immobilized with resin to make abrasion-resistant composite sheet. The sheet comprises an upper outer surface, and a lower surface, a planar fibrous network located between and substantially parallel to the upper and lower surfaces. This composite sheet further comprises pile-like fibers that loop through the planar fibrous network and protrude generally perpendicularly from the planar fibrous network extending to the upper outer surface of the composite sheet, and a resin that immobilizes the pile-like fibers in a position generally vertical to the planar fibrous network. In accordance to the '473 patent, the stratum of pile-like fibers has a height in the range of 0.5 to 3.0 mm and a concentration of vertical pile-like fibers in the range of 0.05 to 0.5 g/cm³. The resin extends through the stratum of pile-like fibers from the upper outer surface to a depth of at least 0.5 mm, and more preferably throughout the composite. The resin-containing depth of the pile-like stratum has a density of at least 0.5 g/cm³. The composite sheet has a stretchability of no greater than 25%, a compressibility of no more than 25%, and a total unit weight in the range of 150 to 3,000 g/m². Typically, the composite sheet comprises in the range of 30 to 90 percent resin, preferably at least 50% and most preferably at least 70%, based on the total weight of the composite. The composite sheet of the '473 patent has a concentration of the vertical pile-like fibers in the range of about 0.1 to 0.35 g/cm³. The density of the resin-containing depth of the pile-like stratum is in the range of about 0.7 to 1.0 g/cm³. The height of the stratum of pile-like fibers is in the range of 1 to 3 mm, and the resin preferably extends throughout the entire pile-like stratum. Typically, the composite sheet exhibits a 40-grit Wyzenbeek abrasion wear of no more than 50 microns per 1,000 cycles.

The '473 patent also discloses a process of making the composite sheet and a shaped article that has the abrasion-resistant composite sheet attached to at least a portion of the surface of the article. The composite made in accordance to the '473 patent can be expensive and can be stiff and inflexible due in part to the high amount of resin used to immobilize the pile or pile-like fabrics. Hence, there remains a need in the art for abrasion-resistant composite sheet that is more flexible, embossable and less expensive to make.

SUMMARY OF THE INVENTION

The invention is directed to an abrasion resistant composite sheet capable of withstanding at least about 3,000 cycles on the Wyzenbeek abrasion test using 80-grit abrasive paper.

The present invention is also directed to an abrasion-resistant composite sheet that is flexible, moldable and embossable.

The present invention is also directed to an abrasion-resistant sheet comprising an open random fibrous web having substantially vertical fibers near a top surface and at least a first binder resin. The first binder resin has a melting temperature lower than the melting temperature of the web fibers of the open random fibrous web, and the resin and the fibers form a resin-fiber rich region on the top surface. The total amount of binder resin makes up about 30% or less by weight of the abrasion-resistant sheet. Furthermore, the fiber resin and the web fibers are co-dyeable. Preferably, the total amount of binder resin can be about 20% or less by weight of the abrasion-resistant sheet, or about 10% or less by weight of the abrasion-resistant sheet.

The present invention is also directed to a composite sheet comprising an open random fibrous web having substantially vertical fibers near a top surface, a first binder resin and a second binder resin. The first binder resin has a melting point lower than the melting point of the second binder resin preferably by at least 40° C., and the melting point of the second resin is lower than the melting point of the web. The resins are activated in situ with the web fibers to form a resin-fiber rich region on the top surface.

In accordance with one aspect of the present invention, the abrasion-resistant sheet comprises an open random fibrous web having substantially vertical fibers near a top surface and a binder resin intimately intermixed within the open random fibrous web. The web fibers and the binder resin near the top surface form a thin densified layer. The melt flow index of the binder resin is preferably greater than about 5 grams per 10 minutes, more preferably greater than about 10 grams per 10 minutes, and most preferably greater than about 15 grams per 10 minutes.

In accordance with another aspect of the present invention, the activation of the first binder resin follows a gradient within the open random fibrous web.

In accordance with another aspect of the present invention, the abrasion-resistant sheet has an embossing factor in the range of about 2 up to about 6.

In accordance with another aspect of the present invention, the abrasion-resistant sheet exhibits at least 20% stretch with at least 90% recovery in at least one direction after being embossed. More preferably, the sheet exhibits at least 30% stretch with at least 90% recovery in at least one direction.

The present invention is also directed to a process of making an abrasion-resistant sheet comprising the steps of (a) providing an open random fibrous web having substantially vertical fibers proximate a top surface and at least a first binder resin and a second binder resin, wherein the melting temperature of the second binder resin is higher than the melting temperature of the first binder resin and is lower than the melting temperature of the web fibers in the open random fibrous web, (b) at least partially activating the first binder resin, (c) reinforcing the web, and (d) at least partially activating the second binder resin to form a fiber-resin rich region on top of the web.

Step (c) may further include stitch-bonding the web, and step (d) may involve contracting the web. After step (d), the process may further include the step of hot pressing to form a thin densified layer. Additionally, step (a) may further include applying the first or second binder resin by forming a low-melting sheath around the web fibers, or applying the first or second binder resin by sifting the binder resin in fine solid powder form onto the web.

The present invention is further directed to a process of making a composite sheet comprising the steps of (a) providing an open random fibrous web having substantially vertical fibers proximate a top surface having a binder resin intimately intermixed with the open random fibrous web, wherein the melting point of the binder resin is lower than that of the web fibers in the open random fibrous web, (b) at least partially activating the binder resin and cooling the web, and (c) hot pressing the web to form a thin densified skin on the web.

Step (a) may further comprise needle-punching the fibers to form the open random fibrous web, or forming binder resin sheaths around the fibers, or step (a) may include the steps of providing binder resin fibers and combining the binder resin fibers with the web fibers to form the open random fibrous web.

The present invention is further directed to a process of making a composite sheet comprising the steps of (a) providing an open random fibrous web having substantially vertical fibers proximate a top surface having at least a first binder resin applied to the open random fibrous web, wherein the melting point of the first binder resin is lower than that of the web fibers in the open random fibrous web, (b) at least partially activating the binder resin in the web, and (c) maintaining the weight percentage of resin to less than 30%.

Additionally, the open random fibrous web in step (a) further comprises a second binder resin applied thereto. This process may further include the step of activating the second binder resin, and the step of reinforcing the open random fibrous web, by stitch-bonding and contracting the web.

The present invention is further directed to a process of intermixing fibers with a thermoplastic, nonelastomeric resin in solid form, with the resin amounting to less than about 30% of the weight and having a melting point 10-50 degrees C. lower than the melting point of the fibers, to form an open, low density fiber/resin composite sheet, wherein the surface fibers have a predominant orientation vertical to the sheet, with the sheet weighing 150-1500 gms/m$^2$, and having a thickness between 1 and 6 mm, and heating the composite during or after sheet formation to a temperature between the two melting points to melt the resin and cause it to interbond the fibers in-place, resulting in a final density of 0.1 to 0.7 gm/cc and a thickness of 1-3 mm.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1A:
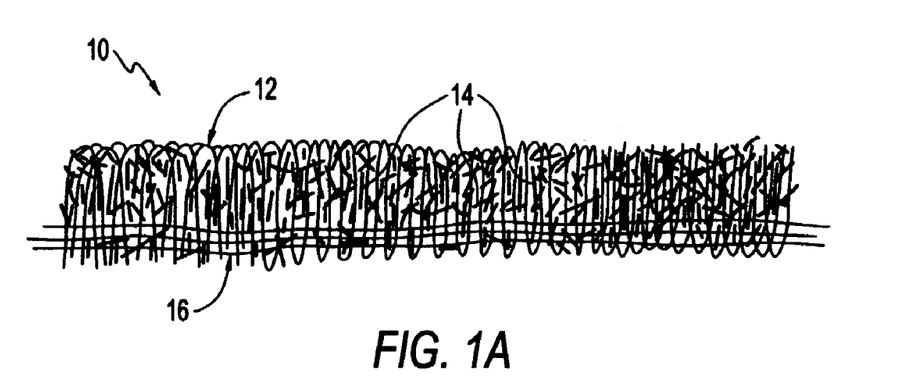
FIG. 1A is a cross-sectional view of a preferred embodiment of a composite in accordance to the present invention prior to binder activation.

As illustrated in FIG. 1A and discussed in details below, the present invention is directed to improved abrasion-resistant composites that are flexible, light-weight and extensively moldable and embossable. The inventive composite 10 comprises open random fibrous webs or structures 12, such as fiber-on-end or pile-like fabrics described in the '473 patent, or fabrics that have needlepunched or spunlaced simple carded, airlaid or spunlaid webs. Webs 12 may have fiber-on-end loops, as shown in the left two-thirds of FIG. 1A, or fiber-on-end free ends, as shown in the right one-third of FIG. 1A. The '473 patent is hereby incorporated by reference herein in its entirety. The surface fibers in these open fibrous webs preferably have a predominantly vertical orientation in the form of upstanding ends, or loops with legs descending into the webs. The inventive composite further comprises resin(s) in fibrous, fibril or powdered solid forms 14 intimately intermixed among the open fibrous webs. Resin may also be in the form of a sheath disposed around the cores of the fibers in the open random fibrous webs.

Figure 1B:
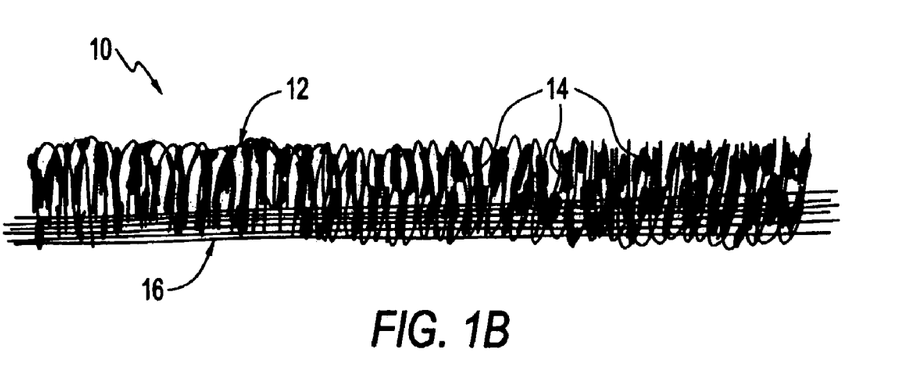
FIG. 1B is a cross-sectional view of the preferred embodiment of FIG. 1A after binder activation.

In accordance to one aspect of the present invention, the resin is activated in situ in the composite as illustrated in FIG. 1B. According to one embodiment, at least two resins with different melting points are used in the composite. The resins are preferably incorporated in the open fibrous web before any other processing steps. In a first heating step, a first resin with the lower melting point is activated and the second resin is preferably tacked to hold the resins in place preferably at or near the top of the fibrous web, so that in subsequent manufacturing steps the resins are not dislodged and migrate toward the center or bottom of the web. Subsequent manufacturing steps include, but not limited to, stitch-bonding and/or contraction to increase the density of the web and laminating supporting layer(s) to the web. Once bulking or contraction is completed, a second heating step activates the remaining resins to form a resin-fiber rich layer on top of the composite. The constructions of the present invention, whether they utilize single or multiple resin systems, require relatively less resin and provide the composite web with superior flexibility and moldability in comparison to prior art, namely the '473 patent. In all embodiments of this invention, less than 30% by weight of total resins is utilized in the composite.

Figure 1C:
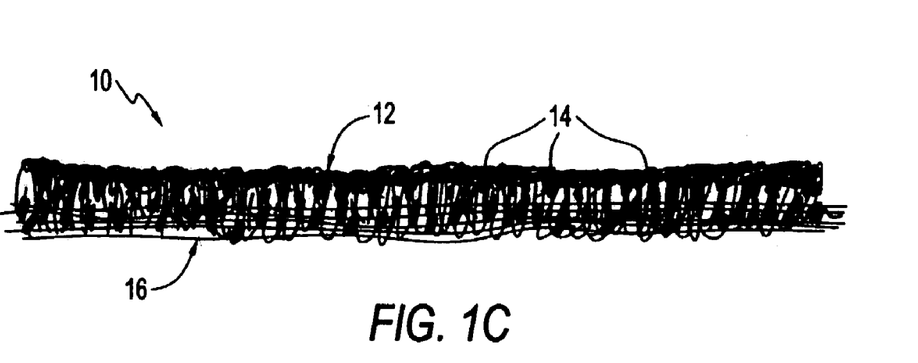
FIG. 1C is a cross-sectional view of the preferred embodiment of FIGS. 1A and 1B after an optional surface densification step.

In accordance to another aspect of the invention, the abrasion-resistant composite may comprise a thin densified skin of resin and fibers formed on top of the composite web as illustrated in FIG. 1C. This thin densified skin can be formed when heat is applied with pressure, or can be formed with a second heating step. This thin densified skin improves the abrasion resistance without reducing the flexibility of the composite web. Additionally, the activation of resin within the composite may follow a gradient having higher resin activation on the top of the composite and lower resin activation toward the bottom of the composite.

In accordance to another aspect of the invention, the composite comprises a single resin intimately intermixed among the open fibrous webs. In one embodiment, the resin forms a sheath around a fiber core, and the sheath/core fibers are carded, lapped and formed into a needle-punched web. In another embodiment, the resin is applied to the open fibrous web as low denier fibers/fibrils that are carded and lapped with staple fibers to form a needle-punched web. These webs have fiber-on-end loops or free fiber ends on the top surface, as illustrated in FIGS. 1A and 1B. The webs are heated to partially activate the resin and then cooled. The activated web, which remains flexible, may then be hot pressed to further activate the resin to form a thin densified skin on the top of the composite.

In accordance to another aspect of the invention, the resin(s) utilized in the composite preferably has a low melt index so that the thin densified skin can be formed quickly by short exposure to heat and pressure without allowing the melting resin to flow and reinforce internal fiber intersections or to reinforce the structure of the composite. This fast formation of the thin densified skin preserves the flexibility by avoiding the hardening of the rest of the composite. Melt index is defined as the mass rate of flow of thermoplastic polymer through a specified capillary under controlled conditions of temperature and pressure. Melt index can be measured in accordance with either ASTM D 1238 standard or ISO 1133 standard. ASTM D 1238 measures the amount in grams of a thermoplastic resin that can be forced through an extrusion rheometer orifice of 0.0825 inch in diameter when subject to a known force (e.g., 2.16 kg) in 10 minutes at known temperature (e.g., 190° C.). ISO 1133 measures melt flow index either as melt volume-flow rate (MVR) or melt mass-flow rate (MFR). MVR is the volume in cubic centimeter and MFR is the mass in grams that can be forced through an extrusion rheometer die in 10 minutes having a diameter of about 2.095 mm (0.0825 inch) when subjected to a known temperature (e.g., 160° C. or 190° C.) and a known force (e.g., 2.16 kg). Melt flow index pursuant to ASTM D 1238 is equivalent to the mass flow rate (MFR) pursuant to ISO 1133. The known benefits of high melt flow index include, but are not limited to, higher flow during heat sealing and the ability to form thin film of cured or activated resins. The melt flow index of the binder resin is preferably greater than about 5 grams per 10 minutes, more preferably greater than about 10 grams per 10 minutes, and most preferably greater than about 15 grams per 10 minutes at temperature of either 160° C. or 190° C. and applied force of 2.16 kg.

In accordance to another aspect of the present invention, the inventive composite is highly embossable and highly moldable, in part due to the relatively low melt index of the binder and in part due to the low amount of resin(s) used in the composite, and due to the fact that most of the activated resin(s) is concentrated on top of the composite with the reinforcing layer being substantially free of binder. In accordance to yet another aspect of the present invention, the composite is embossable and moldable to the extent that stitch-bonded reinforcing yarns separate from the random fibrous layer at the bottom of the composite web. If the stitched reinforcing yarns are elastic they can also provide an additional elasticity property to the composite.

Preferably, the resins are selected so that the resins can be dyed along with the fibers so that as the surface of the composite is worn during use, the color of the worn areas remains the same as the rest of the composite throughout its useful life.

The above aspects of the present invention and other advantageous aspects are discussed in details below.

As stated above, the composites in accordance to the present invention comprise open random fibrous webs, which include any construction where the fibers are separated and are not fully stacked in tight parallel form. Open random fibrous webs include most nonwovens made from staple or filament fibers, wherein most of the individual fibers, if parallel, are spaced apart from each other by a distance at least as large as the diameter or cross-section of the individual fibers or are crossed in at least one direction or plane, so that the open random fibrous webs can accommodate or accept resins or adhesives in fine solid forms, such as fibers, pulps, powders, fibrids, fibrils between the fibers. Examples of these open random fibrous nonwovens include, but are not limited to, needlepunched, spunlaced, carded, airlaid, or spunlaid webs. Open random fibrous webs also include fiber-on-end or pile-like fibers or webs. The '473 patent, which has already been incorporated by reference in its entirety, defines "pile-like fibers" or webs as tufted yarns, loop-pile yarns, cut-pile yarns, buckled yarns, inverted U-shaped loops formed from buckled nonwoven layers of textile fibers, as well as the pile fibers of velvets, velours, terry cloths and the like. Suitable pile-like fibers or webs further include post-opened cut-pile or velours or velvet fabrics, which have been brushed, sheared or otherwise post-formed. Open random fibrous webs may also include knit and woven fabrics, so long as resins or adhesives in fine solid forms can be accommodated or accepted therein. Suitable knit and woven fabrics are disclosed in U.S. Pat. No. 5,707,710 entitled "Composite Sheet for Artificial Leather" to Dimitri Zafiroglu. The '710 patent is hereby incorporated by reference in its entirety. Suitable knit and woven fabrics are generally made from highly textured, high melt yarns and may be "opened" by mechanical or hydraulic needling processes. Lower melt yarns can also be knitted or weaved into the knit or woven fabrics.

Suitable polymeric resins include, but are not limited to, polyesters, nylon, polyamides, synthetic rubbers, polyacrylates polyethers, polyetheresters, polyurethanes, copolymers and mixtures thereof and the like. Preferably, the resins are co-dyeable with the open random fibrous webs, so that the composite sheets may retain the same color even when it is worn. Also preferably, the resins are inexpensive and are easy to handle during manufacturing. Resins can be formed integral to the fibers of the open random fibrous webs, i.e., the resins form a part of the cross-section of the web fibers. For example, the resins can form the lower melting sheath and the fibers can form the higher melting core. Alternatively, the resins can be co-extruded side-by-side with the web fibers. One or more resin fibers can be co-extruded to surround web fiber cores.

Resins in fine forms, e.g., powder, short fibers, fibrils or pulps, can also be incorporated into the open random fibrous webs by sifting, sprinkling or aqueous solution so long as the solid particles remain on the webs after drying. Preferably, when fine form resins are used the resins remain on or near the top of the webs. It is unnecessary for the fine form resins to impregnate the entire thickness of the open random fibrous webs. This avoids the unnecessary stiffness to the composite caused by having the resin proceed throughout the composite and later activated.

In accordance to one embodiment of the present invention, a low-melting thermoplastic resin having low melt flow index or low melt viscosity is incorporated into the open random fibrous web by intimately blending or mixing-in the resin in fine solid form before any processing step. Preferably, two resins are used. The first resin would have a lower melting point than the second resin. Both resins would have lower melting point than the fibers in the open random fibrous web, and lower than the yarns used to contract or bulk the web, if any. Preferably, the resins have melting points that are about 20-50° C. lower than that of the fibers in the open random fibrous web. Both resins can be applied to the open random fibrous web in fine forms as described above. Preferably, the lower melting resin is formed as the sheath to the fibers in the open random fibrous web.

Preferably, in a first heating step heat is applied to the resin-containing open random fibrous web at a temperature between the melting points of the resins, so that as the first resin melts it preferably holds the second resin in place, and helps reinforcing the open random fibrous web. Afterward, the web may be reinforced by a network of reinforcing yarns or by backing the web with a fabric or film substantially free of resin. Advantageously, the second higher melt resin remains substantially in place at or near the top of the web during the reinforcing step due to the prior activation of the first lower melt resin. This avoids the migration of the second resin throughout the web to cause unnecessary stiffness to the composite. A second heating step is applied to the resin-web to activate the second resin to form the composite. The resins are preferably concentrated only at or near the top of the composite, where abrasion would take place, thereby reducing the need for resin. The resin-open random fibrous web, excluding reinforcement, if any, has a thickness in the range of about 0.5 to about 3.0 mm, a basis weight in the range of about 100 to about 1000 g/m$^2$ and a density in the range of about 0.1 to about 0.7 g/cm$^3$, and contains preferably less than about 30% of resins by total weight.

In one embodiment, after the reinforcement step the resin-web is buckled or contracted to reorient the fibers towards the direction normal to the sheet and to increase its density. Contraction and buckling of the resin-open random fibrous web, if the web is a fibrous nonwoven layer, can be accomplished in several ways. For example, a contractible element, or array of contractible elements, is intermittently attached to the resin-open random fibrous web. The spacing between attachment locations is typically at least 1 mm to allow for efficient buckling. Then, the element or array of elements is caused to contract so that the area of the resin-open random fibrous web is decreased significantly and groups of fibers buckle out of the plane of the layer. Before the contractible elements are attached, additional gathering or contraction can be imparted to the starting fibrous nonwoven layer by over-feeding the layer to the apparatus being employed to attach the contractible elements.

Many types of contractible elements are suitable for use in the present invention. For example, the resin-open random fibrous nonwoven web can be stitch-bonded with elastic yarns under tension. Textured stretch yarns, covered or bare spandex yarns and the like are suitable yarns for contractible element stitching. After the stitching, the tension can be released to cause the desired contraction and buckling of the resin-open random fibrous web and/or heat can be applied to contract the stitching yarns. Instead of stitching, extended elastic elements in the form of warps, cross warps, films or the like, can be intermittently attached to the resin-open random fibrous web by hydraulic entanglement, adhesive or thermal point bonding, or the like. Thereafter, tension on the extended elements can be released to cause the desired contraction and buckling of the web.

Other types of contractible elements, which shrink on being treated with heat, moisture, chemicals or the like, can be attached intermittently to the fibrous nonwoven layer without initial tension or extension in the elements. After attachment, the contraction of the contractible elements can be activated by appropriate treatment.

Still another way of accomplishing the contraction and buckling of the resin-open random fibrous web involves intermittently attaching the web to a stretchable substrate that necks-in in a direction perpendicular to the direction in which the substrate is pulled. For example, certain substrates, when stretched by 15% in one direction, can automatically experience substantially irreversible contraction (i.e., neck in) in a direction perpendicular to the stretch by an amount that is two or three times the percentage stretch. Thus, appropriate intermittent attachment of a fibrous nonwoven layer to the stretchable substrate before the stretching and necking-in operation, and then applying the stretching forces to the combined layer and substrate, can significantly decrease the area of the fibrous nonwoven layer and cause buckling of groups of fibers as required by the process of the invention.

In other embodiments of the process of the invention, the resin-open random fibrous web is derived from conventional yarns in a knit or woven fabric, which is constructed with contractible elements. When the contractible elements contract, the area of the fabric decreases significantly and causes the conventional yarns of the fabric to gather and buckle and project from the plane of the fabric. In another embodiment, the open random fibrous web includes fibers or loops of fibers that project from wrapping yarns that were loosely wrapped around the axis of the contractible core of an elastic combination yarn.

In still other embodiments of the process, an open random fibrous web is derived from a combination of a contracted substantially nonbonded fibrous nonwoven fabric, loose wrapping yarns of a contracted combination yarn and/or a buckled non-elastic yarn. In those embodiments wherein the open random fibrous web is formed partially or totally from buckled yarns derived from a knit or woven fabric, the knit or weave is sufficiently coarse to permit the yarns to buckle adequately. Typically, the buckled elements, before buckling have a flat length of at least 1 mm. In still another embodiment, a tufted fabric is contracted to increase the density of the tufted pile fibers for use in a composite sheet of the present invention.

In another embodiment, the product is formed using an array of composite/contractible yarns. Such yarns have a contractible core (e.g., as provided by an elastic or shrinkable yarn) surrounded by a non-contractible conventional "wrapping" yarn or "covering" yarn. The wrapping or covering yarn may be of any natural or synthetic fiber. The wrapping may be combined with the elastic core while the elastic core is under tension by conventional wrapping, winding, plying, covering, air jet entangling or intermingling or the like. The core may be a yarn or monofilament of any elastic or contractible material. Cores of spandex yarn are preferred. Cores of partially oriented yarn (POY), such as high shrinkage polyester POY, are also preferred. If the wrapping yarn is combined loosely (e.g., fewer than 3 turns/inch) with a tensioned and extended elastic core, when the tension is released, the core contracts and the wrapping yarn contracts and buckles perpendicular to the core. Similarly, if the combination yarn has a core of contractible yarn that is combined loosely with a bulkable wrapping, the wrapping will buckle when the contraction of the core occurs. If a fabric is knit, woven or stitchbonded with a combination yarn under tension, when the tension is released from the combination yarn, the yarn contracts and the wrapping yarn buckles contributing pile-like fibers to the surface layer. Binder in this embodiment can be introduced in solid forms using low melt yarns as part of the surrounding yarn component, or even sheath/core low melt/high melt yarns as the whole or part of the surrounding yarn system. Binder can also be introduced in the form of powders or fibrils into the yarns or the formed sheet before, during or after contraction.

The contraction step is preferably employed before or during application of the resin. When the resin-open random fibrous web is reinforced by a network of yarns as discussed above, only about 30% by weight or less of resin to the entire composite is required to produce desirable abrasion-resistant composite, thereby reducing the costs of manufacturing abrasion-resistant composite. This represents a significant improvement over the known prior art.

In accordance to another embodiment of the invention, pressure is applied either in conjunction with the second heating step, e.g., by pressing a hot platen, a hot roll, a hot belt or the like, on the top of the contracted resin-open random fibrous web and a cold plate to the bottom, or immediately after the second heating step. The applied heat and pressure provide the composite with a thin densified skin that resists abrasion and resists cracking when the composite is bent. The thin densified skin can bend or flex repeatedly without developing high stress on its surface, and therefore providing the composite high flex-crack resistance without having to utilize expensive high elongation resins, such as some polyurethanes. Advantageously, since the remaining thickness of the composite has lower density, the composite has higher flexibility and softness.

Additionally, the heat and pressure are applied to the composite only for a short time period, as illustrated in Examples 2, 6 and 7 below, due to the preferred low melt index of the resins to produce the thin densified skin. The short application time does not allow for heat to propagate through the entire thickness of the composite, and causes a temperature gradient to develop through the thickness of the composite. This temperature gradient causes the activation of the resins to follow a similar gradient with higher level of activation near the hot plate and lower level of activation near the cold plate. This activation gradient prevents abrupt local variations of resin activation within the composite and therefore minimizes the development of high stress areas inside the composite during bending and flexing.

Abrasion-resistant composite sheets of the invention are suitable for use in many different articles. The sheets can be molded into various shaped articles, can be used as single or multiple layers, or can be attached by various means to the surface of various shaped articles. For example, composite sheets of the invention are suited for use in shoe uppers, work gloves, automotive engine timing belts, leather-like apparel, indoor athletic protective pads, women's pocketbooks, bags, luggage, saddles, seating surfaces, etc. The more abrasion-resistant composite sheets of the present invention are especially suited for articles that are subjected to more demanding abrasion conditions, such as toe, heel and/or sole portions of shoes, bottoms of industrial bags that are often dragged on concrete floors, bearing surface of interacting mechanical parts, soccer balls, heavy duty work boots, gloves, motor-cyclist apparel pads, and the like.

As used herein, the basis weight or unit weight of a fabric or fibrous layer is measured according to ASTM Method D 3776-79. The density of the resin-impregnated fabric is determined from its unit weight and its measured thickness. The over-feed ratio, contraction ratio and total gather are parameters reported herein which measures of how much an initial fibrous layer contracts or gathers as a result of the operations to which the layer is subjected.

The over-feed ratio, which applies only to the embodiments of the invention, which employ a buckled nonwoven fibrous layer, is defined as the ratio of the initial area of a starting fibrous nonwoven layer to the area of the layer immediately up-stream of a first processing step (e.g., a stitch-bonding step). Over-feed causes buckling, gathering or compression of the nonwoven layer in the direction in which it is being fed to the operation.

The contraction ratio is a measure of the amount of further contraction the nonwoven layer undergoes as a result of the specific operation to which it is subjected (e.g., stitch-bonding, release of tension from yarns to which the fibrous layer was intermittently attached). The contraction ratio is defined as the area of the fibrous layer as it enters the specific operation divided by the area of the fibrous layer as it leaves the specific operation. The total gather is defined as the product of the over-feed and contraction ratios. The fraction of original area is the reciprocal of the total gather and is equivalent to the ratio of the final area of the fibrous layer to the initial area of the starting fibrous layer.

To determine the abrasion resistance of samples, a Wyzenbeek "Precision Wear Test Meter", manufactured by J. K. Technologies Inc. of Kankakee, Ill., is employed with an 80-grit (or a 40-grit) emery cloth wrapped around the oscillating drum of the tester. The drum is oscillated back and forth across the face of the sample at 90 cycles per minute under a load of six pounds (2.7 kg). The test is conducted in accordance with the general procedures of ASTM D 4157-82. The thickness of the sample is measured with the aforementioned thickness gage before and after a given number of abrasion cycles to determine the mm of thickness lost per 1,000 cycles. Note that the thickness abrasion rate with 40-grit paper is typically about 4 to 8 times greater than that abraded with 80-grit paper.

The flexibility or flexing endurance of the samples is based on the IUF 20 method of International Union of Leather Chemists Association using a Bally Flexometer (Bally SchuhFabriken AG, Schoenenwerd, Switzerland). The composite specimens (65 mm. by 40 mm.) were flexed and examined for damage after a predetermined number flexes. The number of cycles at which 10 or more small cracks first appeared in the specimen was recorded. Typically, a minimum of 10,000 flexes under dry conditions without 10 or more small cracks is considered acceptable.

As mentioned above and discussed in further details in Example 8 below, advantageous aspects of the present invention include the moldability and embossability of the abrasion-resistant composite web of the present invention.

Figure 2A:
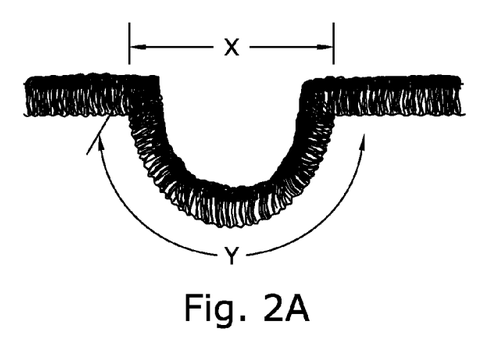
FIG. 2A is a cross-sectional view showing the moldability of composites in accordance with the present invention.

The moldability factor, M, is defined with respect to FIG. 2A, which shows a portion of the inventive composite being molded and formed into an arbitrary shape, such as dome or semi-circular as shown. The moldability factor, M, is defined as the ratio of the arc length Y measured along the molded shape to the linear length X at the base of the molded shape. Preferably, the moldability factor is greater than at least about 1.3, more preferably greater than about 1.5 and most preferably greater than 2.0. In other words, $M \geq 1.3$, more preferably $M \geq 1.5$, and most preferably $M \geq 2.0$. The arbitrary shape includes any shape such as polygonal, circular, parabolic, among others.

Figure 2B:
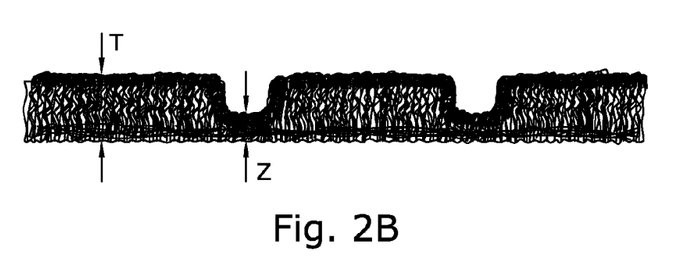
FIG. 2B is a cross-sectional view showing the embossablity of composites in accordance with the present invention.

The embossing factor, E, is defined with respect to FIG. 2B, which shows a portion of the inventive composite being embossed. The embossing factor, E, is defined as the ratio of the uncompressed thickness, T, of the composite to the compressed thickness, Z, of the composite. Preferably, the embossing factor is greater than about 2, more preferably greater than about 3, even more preferably greater than about 4 and can be greater than about 6. In other words, $E \geq 2$, preferably $E \geq 3$, more preferably $F \geq 4$ or $E \geq 6$. In FIG. 2B, the embossed composite sheet is shown to have a relatively flat bottom surface. However, the bottom surface may have any shape, e.g., the embossed composite sheet may have an undulating shape.

EXAMPLES

The examples, discussed in below, all compare favorably to generally acceptable abrasion-resistant composites, which typically can withstand about 3,000 cycles on the Wyzenbeek test using 80-grit paper, i.e., without having the composite being worn through. Furthermore, as stated above composites lasting 10,000 Bally flexes without 10 or more small cracks are considered acceptable.

Example 1

Open Random Fibrous Web:
Carded web consisting of a blend of 90% of 4 denier/filament ("dpf") sheath/core polyester and 10% of 6 dpf high melt staple polyester. The sheath/core polyester comprises 50% sheath with a melting temperature of 110° C., and 50% core with a melting temperature of 235° C. The basis weight of the carded web is about 23 g/m².

Resins:
The first resin is the polyester sheath of the sheath/core component of the open random fibrous web with a melting temperature of 110° C.
The second resin is a polyester powder with a melting temperature of 126° C. sifted onto the open random fibrous web ("resin-fiber web").

First Heating Step:
The resin-fiber web was run through a chamber heated to approximately 120° C. for about 5 seconds to melt the first resin and tack the second resin.
The resin-fiber web comprises about 19% polyester sheath first resin, about 19% polyester core fiber, 57-58% polyester powder second resin, and 4% 6-dpf polyester staple fiber. The basis weight of the resin-fiber web after the first heating step is about 61 g/m².

Reinforcement Step:
The partially bonded resin-fiber web was stitch-bonded on a 150-inch wide Liba stitch-bonding machine using two bars at 14 gauge and 14 courses per inch (cpi). The back bar stitches a high-tenacity textured polyester yarn of 220 denier/50 filaments in a 1-0,3-4 repeating stitch pattern. The front bar stitches 280 denier Lycra® yarn air tangled with 70 denier textured polyester in a 1-0, 2-3 repeating stitch pattern. The resin-fiber web was overfed at 29%.

The stitch-bonded resin-fiber web has a basis weight of about 160 g/m², and comprises about 3% of the first resin, 20% of the second resin, 10% total 6-pdf and core polyester fibers and 67% total stitch-bonded yarns. The overall resin content in the stitch-bonded resin-fiber web is only about 23% of the total weight, and about 70% of the top fibrous surface. Hence, while the total resin percentage is low, i.e., less than 30%, the top fibrous surface remains resin-fiber rich.

Contraction/Bulking (Second Heating) Step:
The stitch-bonded resin-fiber web was then processed through a textile tenter frame at about 190° C. for about 30 seconds. The web contracted about 2.3 times in both the machine direction and the cross direction. The final composite's basis weight is about 850 g/m² and a final thickness of about 2.04 mm. The final density is about 0.41 g/cm³ based on the entire structure, and is about 0.19 g/cm³ based on the structure without the stitch-bonding yarns.

Test Results:
Samples made in accordance to Example 1 can withstand at least 6,000 cycles on the Wyzenbeek Abrasion test using 80-grit abrasive paper and 15,000 cycles using the Bally Flex method.

Example 2

Open Random Fibrous Web:
Same as Example 1.

Resins:
Same as Example 1, except that the amount of the second polyester resin is increased by about 30%.

First Heating Step:
Same as Example 1.
The resin-fiber web comprises about 16% polyester sheath first resin, about 16% polyester core fiber, 63-64% polyester powder second resin, and 4% 6-dpf polyester staple fiber. The basis weight of the web with the resins after the first heating step is about 75 g/m².

Reinforcement Step:
Same as Example 1, with the yarn feed reset to accommodate a bulkier nonwoven. Yarn consumption was higher than Example 1.
The basis weight is about 260 g/m², and comprises about 5% of the first resin, 21% of the second resin, 8% total of 6-dpf and core polyester fibers and 68% of stitch-bonded yarns. The overall resin content in the stitch-bonded resin-fiber web is only about 26% of the total weight of the composite, and about 81% of the top fibrous surface. Hence, similar to Example 1, while the total resin percentage is less than 30%, the top fibrous surface remains rich in resin and fiber.

Contraction/Bulking (Second Heating)Step:
Same as Example 1.
The final composite's basis weight is about 1152 g/m² and a final thickness of about 2.93 mm. The final density is about 0.41 g/cm³ based on the entire structure, and is about 0.13 g/cm³ based on the structure without the stitch-bonding yarns.

Test Results:

Samples made in accordance to Example 2 can withstand at least 4,500 cycles on the Wyzenbeek abrasion test using 80-grit abrasive paper and 30,000 cycles using the Bally Flex method.

Optional Hot Press Step:

The contracted composite was pressed by a hot press from one side only at 220° C. for about 1 second with a set gap of 2.0 mm. This hot-pressed composite has a final thickness of 1.6 mm and a thin densified skin, as discussed above. This thin densified skin is resin and fiber rich. The hot-pressed composite can withstand 9,000 cycles on the Wyzenbeek abrasion test using 80-grit abrasive paper, which is twice as much as the result of the same test conducted on the pre-hot-pressed composite.

Example 3

Open Random Fibrous Web:

Carded web consists of sheath/core Nylon. The sheath/core Nylon comprises 50% sheath with a melting temperature of 140° C., and 50% core with a melting temperature of 225° C. The basis weight of the carded web is about 26 g/m².

Resins:

The first resin is a polyamide powder with a melting temperature of 95° C. sifted onto the open random fibrous web ("resin-fiber web").

The second resin is the Nylon sheath of the sheath/core component of the open random fibrous web with a melting temperature of 140° C.

First Heating Step:

The resin-fiber web was run through a chamber heated to approximately 120° C. for about 5 seconds to melt the first resin and tack the second resin.

The resin-fiber web comprises about 90% Nylon sheath/core and about 10% polyamide powder resin, and has a basis weight of about 26 g/m².

Reinforcement Step:

The partially bonded resin-fiber web was stitch-bonded on 150-inch Liba stitchbonder using two bars at 14 gauge and 16 CPI. The back bar stitches a 270 denier/34 filaments partially-oriented yarn (POY) in a 1-0, 3-4 repeating stitch pattern. The front bar stitches 70 denier/34 filaments textured polyester in a 3-4, 1-0 repeating stitch pattern. The resin-fiber web was overfed at 9%.

The stitch-bonded resin-fiber web has a basis weight of about 155 g/m², and comprises about 2% of the first low melt resin, 8% of the second resin, 8% Nylon core fibers and 82% total stitch-bonded yarns. The overall resin content in the stitch-bonded resin-fiber web is only about 10% of the total weight, and about 45% of the top fibrous surface.

Contraction/Bulking (Second Heating) Step:

The stitch-bonded resin-fiber web was then processed through a textile tenter frame at about 190° C. for about 30 second. The web contracted about 30% in the machine direction and 60% in the cross direction. The final composite's basis weight is about 531 g/m² and a final thickness of about 1.52 mm. The final density is about 0.35 g/cm³ based on the entire structure, and is about 0.04 g/cm³ based on the structure without the stitch-bonding yarns.

Test Results:

Samples made in accordance to Example 3 can withstand at least 6,000 cycles on the Wyzenbeek Abrasion test using 80-grit abrasive paper and 42,000 cycles using the Bally Flex method.

Example 4

Open Random Fibrous Web:

Carded web consists of sheath/core polyester 4 dpf fibers. The first sheath/core fibers make up 80% of the web, and its polyester (PET) sheath has a melting temperature of 180° C., and the second sheath/core fibers make up 20% of the web and its polyester (PET) sheath has a melting temperature of 110° C. The core has a melting temperature of 225° C. The first sheath/core fibers comprise 40% sheath and 60% core. The second sheath/core fibers comprise 50% sheath and 50% core. The basis weight of the carded web is about 26 g/m².

Resins:

The first resin is the PET sheath of the second sheath/core with melting point of 110° C.

The second resin is the PET sheath of the second sheath/core with melting temperature of 180° C.

First Heating Step:

The resin-fiber web was run through a chamber heated to approximately 120° C. for about 5 seconds to melt the first resin and tack the second resin.

The resin-fiber web comprises about 42% PET resins and about 58% polyester staple fibers, and has a relatively low basis weight of about 26 g/m².

Reinforcement Step:

The partially bonded resin-fiber web was stitch-bonded on 150-inch Liba stitchbonder using two bars at 14 gauge and 16 CPI. The back bar stitches a 270 denier/34 filaments partially-oriented yarn (POY) in a 1-0, 3-4 repeating stitch pattern. The front bar stitches 70 denier/34 filaments textured polyester in a 3-4, 1-0 repeating stitch pattern. The resin-fiber web was overfed at 9%. This stitch-bonded resin-fiber web has the reinforcing yarns positioned near the bottom of the web.

The stitch-bonded resin-fiber web has a basis weight of about 155 g/m², and comprises about 8% of the first and second PET sheath resins, 11% polyester core staple fibers and 81% total stitch-bonded yarns. The overall resin content in the stitch-bonded resin-fiber web is only about 8% of the total weight, and about 42% of the top fibrous surface (without the resin-free stitch-bonded yarns).

Contraction/Bulking (Second Heating) Step:

The stitch-bonded resin-fiber web was then processed through a textile tenter frame at about 190° C. for about 30 second. The web contracted about 30% in the machine direction and 60% in the cross direction. The final composite's basis weight is about 529 g/m² and a final thickness of about 1.52 mm. The final density is about 0.35 g/cm³ based on the entire structure, and is about 0.04 g/cm³ based on the structure without the stitch-bonding yarns.

Test Results:

Samples made in accordance to Example 4 can withstand at least 5,000 cycles on the Wyzenbeek Abrasion test using 80-grit abrasive paper and 32,000 cycles using the Bally Flex method.

Example 5

Open Random Fibrous Web:
　Same as Example 4.

Resins:
　Same as Example 4.

First Heating Step:
　Same as Example 4.

Reinforcement Step:
　The partially bonded resin-fiber web was stitch-bonded on 150-inch Liba stitchbonder using two bars at 14 gauge and 14.2 CPI on a single bar. The bar stitches a 280 denier Lycra® covered with 70 denier/34 filaments textured polyester in a 1-0, 2-3 repeating stitch pattern. The resin-fiber web was overfed at 32%.

The stitch-bonded resin-fiber web has a basis weight of about 80 g/m², and comprises about 19% of the first and second PET sheath resin, 21% polyester core staple fibers and 60% total stitch-bonded yarn. The overall resin content in the stitch-bonded resin-fiber web is only about 19% of the total weight, and about 60% of the top fibrous surface.

Contraction/Bulking (Second Heating) Step:
　The stitch-bonded resin-fiber web was then processed through a textile tenter frame at about 190° C. for about 30 second. The web contracted about 67% in the machine direction and 67% in the cross direction. The final composite's basis weight is about 763 g/m² and a final thickness of about 2.87 mm. The final density is about 0.265 g/cm³ based on the entire structure, and is about 0.11 g/cm³ based on the structure without the stitch-bonding yarns.

Test Results:
　Samples made in accordance to Example 5 can withstand at least 16,000 cycles on the Wyzenbeek Abrasion test using 80-grit abrasive paper.

Example 6

Open Random Fibrous Web:
　The open random fibrous web comprises low-density needle-punched blended web having both low-melt and high melt staple fibers. This blended web also has loops of fibers on the surface that descend into the body of the structure to form fiber-on-end, as discussed above. This blended web comprises 50% 1.5 denier 1.5 inch polypropylene and 50% 15 denier 1.5 inch polyester fibers carded, lapped and formed into a needle-punched web. This web has a basis weight of 490 g/m², a relatively high density of 1,100 needle penetrations per inch², a thickness of 5 mm and a density of about 0.01 g/cm³. The sheath has a melting point of about 160° C. and the core has a melting point of about 230° C.

Resin:
　The single resin in this Example is the 1.5 denier polypropylene with a melting point of 160° C.

First Heating Step:
　This web was heated at 210° C. under planar constraint, such as a screen, and then cooled. The thickness of the web is reduced to 3.8 mm and the density is increased to about 0.13 g/cm³. The basis weight of the heated web is about 490 g/m². The web remains flexible and resilient.

Reinforcement Step:
　None.

Second Heating Step:
　The cooled web was pressed by a hot platen from one side at 210° C. and the other side by second platen at room temperature for about 1 second with a set gap of 1.8 mm to re-melt the surface of the web. This hot-pressed composite has a final thickness of 2.2 mm and a thin densified skin of about 0.2 mm thick. This thin densified skin is resin and fiber rich. The final density of the composite is about 0.25 g/cm³. The basis weight of the web remains about 490 g/m², since there is no contraction step in this example.

Test Results:
　The hot-pressed composite can withstand 3,800 cycles on the Wyzenbeek abrasion test using 80-grit abrasive paper, and 26,000 Bally flex cycles.

Example 7

Open Random Fibrous Web:
　The open random fibrous web comprises low-density needle-punched web having low-melt staple fibers. This web also has loops of fibers on the surface that descend into the body of the structure to form fiber-on-end, as discussed above. This web comprises 1.5 denier 1.5 inch polyester sheath/core fibers. The sheath/core fibers comprise 50% sheath with a melting point of 120° C. and 50% core with a melting point of 230° C. These polyester fibers were carded, lapped and formed into a needle-punched web. This web has a basis weight of 475 g/m², a relatively high density of 1,300 needle penetrations per inch², a thickness of 6 mm and a density of about 0.08 g/cm³.

Resin:
　The single resin in this Example is the polyester sheath with a melting point of 120° C.

First heating Step:
　This web was heated at 220° C. under planar constraint, such as a screen, and cooled. The thickness of the web is reduced to 2.2 mm and the density is increased to about 0.22 g/cm³. The basis weight of the heated web is about 475 g/m². The web remains flexible and resilient.

Reinforcement Step:
　None.

Second Heating Step:
　The cooled web was pressed by a hot platen from one side at 220° C. and the other side by second platen at room temperature for about 1 second with a set gap of 1.3 mm to re-melt the surface of the web. This hot-pressed composite has a final thickness of 1.5 mm and a thin densified skin of about 0.2 mm thick. This thin densified skin is resin and fiber rich. The final density of the composite is about 0.37 g/cm³. The basis weight of the heated web remains about 475 g/m², since there is also no contraction step in this example.

Test Results:
　The hot-pressed composite can withstand 11,000 cycles on the Wyzenbeek abrasion test using 80-grit abrasive paper, and 40,000 Bally flex cycles.

Additionally, this sample was uniformly dyeable throughout. It is also deeply moldable, embossable at temperature of 115° C.

Example 8

The abrasion-resistant composite made in accordance to Example 4 was subjected to a deep embossing process. A six-inch by six-inch sample was restrained at two opposite edges and a hot plate with a corrugated surface compressed the sample against a bottom soft silicon rubber sheet. The corrugated surface comprised ridges that were spaced at 7 ridges per inch or 2 ridges per cm and were 1.8 mm wide. The top plate was set at about 205° C. and applied for a period of 5 seconds and at a pressure of 1,000 psi.

Due to the restraint at the two opposite edges, the sample was stretched to conform to the ridges on the top plate. The ridges "bottomed-out" against the bottom rubber sheet, i.e., the ridges compressed the sample against the rubber sheet until the compressed portions of the composite web essentially solidified. In other words, the resins, staple fibers and stitch-bonding yarns essentially fused together as a solid.

The embossed sample unexpectedly exhibits high elasticity in the direction transverse to the ridges. The embossed sample was stretched by hand to about ⅓ more than its pre-stretch length and the sample quickly returned to its pre-stretch length with no or very little relaxation time. This process was repeated many times without any noticeable plastic deformation of the sample. Preferably, the embossed sample exhibits at least 20% stretch with at least 90% recovery in at least one direction.

Without being limited to any particular theory, the inventors of the present invention believe that the embossing pushes the stitch-bonded yarns to the very bottom of the composite and actually exposes the system of stitch-bonded yarns at the bottom of the composite, and that the stitch-bonded yarns provide the embossed composite the elasticity. In comparison, a second sample made in accordance to Example 4 was pressed between two flat platens under similar conditions. While the stitch-bonded yarns are vaguely visible through the bottom of the composite, the stitch-bonded yarns are still covered by resin and staple fibers. The second sample exhibits no noticeable elasticity.

This embossed sample possesses an embossing factor, E, of at least about 5, and a molding factor, M, of, at least about 1.5.

The advantages of having an elastic abrasion-resistant composite include, but are not limited to, the ability to wrap the composite tightly around an object to be protected, by stretching the composite over the object and releasing the tension allowing the composite to conform to the surface of the protected object. The object can be flat, or preferably can be curved. Applications include, but are not limited to, elbow and knee portions of protective clothing/sheathing, automotive carpeting, protective wrapping for pipes, pipelines, airducts, and etc.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An abrasion-resistant sheet comprising an open random fibrous web having substantially vertical fibers near a top surface, a solid binder resin intimately intermixed within the open random fibrous web, and an embossing factor greater than about 2, wherein the melting temperature of the binder resin is lower than the melting temperature of the web fibers in the open random fibrous web and wherein the web fibers and the binder resin on or near the top surface are heat treated to form a thin densified fiber-resin rich skin, wherein the thin densified fiber-resin skin is denser than other fiber-resin areas of the sheet and wherein the abrasion-resistant sheet can withstand at least about 3,000 cycles on the Wyzenbeek abrasion test using 80-grit abrasive paper and wherein the total amount of binder resin makes up less than about 23% by weight of the abrasion-resistant sheet.

2. The abrasion-resistant sheet of claim 1, wherein the thin densified layer is formed by pressing the fibrous web and solid binder resin between a heated plate and an unheated plate, wherein the heated plate is heated to a temperature above the melting point of the binder resin.

3. The abrasion-resistant sheet of claim 1, wherein the solid binder resin comprises resin fibers and wherein the resin fibers and the web fibers are needle-punched to form the open random fibrous web.

4. The abrasion-resistant sheet of claim 1, wherein the solid binder resin forms a part of the cross-section of the web fibers.

5. The abrasion-resistant sheet of claim 4, wherein the solid binder resin and the web fibers are needle-punched to form the open random fibrous web.

6. The abrasion-resistant sheet of claim 1, wherein the embossing factor is less than about 6.

7. The abrasion-resistant sheet of claim 1, wherein the solid binder resin and the web fibers are co-dyeable.

8. The abrasion-resistant sheet of claim 1, wherein the solid binder resin comprises less than 30% by weight of the abrasion-resistant sheet.

9. An abrasion-resistant sheet comprising an open random fibrous web having substantially vertical fibers near a top surface, at least a first binder resin, wherein the first binder resin has a melting temperature lower than the melting temperature of the web fibers of the open random fibrous web and wherein the resin and the fibers are heat treated to form a resin-fiber rich region on the top surface, and wherein the total amount of binder resin makes up less than about 23% by weight of the abrasion-resistant sheet and wherein the abrasion-resistant sheet can withstand at least about 3,000 cycles on the Wyzenbeek abrasion test using 80-grit abrasive paper.

10. The abrasion-resistant sheet of claim 9, wherein the open random fibrous web is reinforced by yarns stitch-bonded to the web.

11. The abrasion-resistant sheet of claim 10, wherein the stitched-bonded open random fibrous web is contracted.

12. The abrasion-resistant sheet of claim 9, wherein the composite sheet further comprises a thin densified layer of fibers and resin on top of the resin-fiber rich region.

13. The abrasion-resistant sheet of claim 9, wherein the first binder resin forms a part of the cross-section of the web fibers.

14. The abrasion-resistant sheet of claim 9, wherein the first binder resin is applied in a powder form to the open random fibrous layer.

15. The abrasion-resistant sheet of claim 9 further comprising a second binder resin, wherein the melting point of the second binder resin is lower than the melting point of the web fibers and higher than the melting point of the first resin binder.

16. The abrasion-resistant sheet of claim 15, wherein the second binder resin forms a part of the cross-section of the web fibers.

17. The abrasion-resistant sheet of claim 15, wherein the second binder resin is applied in a powder form to the open random fibrous layer.

18. The abrasion-resistant sheet of claim 9, wherein the abrasion-resistant web has an embossing factor greater than about 2.

19. The abrasion-resistant sheet of claim 18, wherein the embossing factor is less than about 6.

20. The abrasion-resistant sheet of claim 9, wherein the fiber resin and the web fibers are co-dyeable.

21. The abrasion-resistant sheet of claim 9, wherein the total amount of binder resin makes up about 2000 or less by weight of the abrasion-resistant sheet.

22. The abrasion-resistant sheet of claim 21, wherein the total amount of binder resin makes up about 10% or less by weight of the abrasion-resistant sheet.

23. An abrasion-resistant sheet comprising an open random fibrous web having substantially vertical fibers near a top surface, at least a first binder resin, wherein the first binder resin has a melting temperature lower than the melting temperature of the web fibers of the open random fibrous web and wherein the resin and the fibers form a resin-fiber rich region proximate the top of the sheet, wherein the abrasion-resistant sheet can withstand at least about 3,000 cycles on the Wyzenbeek abrasion test using 80-grit abrasive paper, and wherein the abrasion-resistant sheet has an embossing factor greater than about 2 and wherein the total amount of binder resin makes up less than about 23% by weight of the abrasion-resistant sheet.

24. The abrasion-resistant sheet of claim 23, wherein the embossing factor is less than about 6.

25. The abrasion-resistant sheet of claim 23, wherein the embossing factor is about 5.0.

* * * * *